UNITED STATES PATENT OFFICE.

WILLIAM H. McLAUGHLIN, OF SAN FRANCISCO, CALIFORNIA.

PREPARATION FOR MASKING THE NAUSEOUS TASTE OF MEDICINES.

SPECIFICATION forming part of Letters Patent No. 267,442, dated November 14, 1882.

Application filed March 10, 1882. (No specimens.)

*To all whom it may concern:*

Be it known that I, WILLIAM H. MCLAUGHLIN, of the city and county of San Francisco, State of California, have discovered an Improved Preparation for Masking the Nauseous Taste of Medicines; and I hereby declare the following to be a full, clear, and exact description thereof.

My discovery relates to a preparation which is principally useful to disguise the bitter nauseous taste of quinine and the other bitter alkaloids.

It consists of a peculiar aqueous fluid extract of an herb commonly known as "*Yerba santa.*" The most common and best known form of this herb is the *Eriodyction glutinosum;* but there are other forms which contain the qualities desired, it being understood that the property which disguises the taste of quinine is not that which gives this herb its value medicinally. The medicinal properties of the herb are expectorant and diuretic, and reside in a resin or resins found in it, and which are only to be extracted for medicinal use by the use of alcohol. In order, however, to prepare my solution, I pulverize the herb and place it in what is known as a "press-percolator," and with cold distilled water treat it until all the matter soluble in water has been extracted. In appearance the aqueous fluid is of a heavy dark-brown color, and it has a slightly sweetish-bitter taste. The residue of the herb from which it was obtained may be dried and afterward treated with alcohol, when the usual fluid extract may be obtained, having all the properties which render the herb of any value medicinally; but these properties are wholly distinct from those of the aqueous solution, and they will not have the desired effect as a vehicle for disguising the taste of quinine.

After having made the aqueous solution of cold water, as above described, there may be added a small quantity of alcohol and any desired flavoring-matter to assist in preserving the solution and in rendering it pleasanter to the taste, but have no effect upon the property before mentioned, which is inherent in itself, and appears to be due to a compound of gallotannic acid, gum, soluble starch, and a peculiar sweet principle which is contained in it. When mixed with this solution the bitter taste of quinine is completely masked.

In some cases it may be found desirable to evaporate the aqueous solution of the herb to dryness, and when this is done the resulting powder will be found to be equally efficient for use with quinine.

This powder may be redissolved in water and brought into the liquid state again at any time.

In some cases it may be found desirable to mix this powder with the proper proportion of quinine, so that the two may be sold in bulk, to be taken either in the dry form or to be mixed in water before being taken.

I am aware that *Yerba santa* has heretofore been treated with alcohol to obtain its resinous or medicinal properties; and I am aware, also, that the herb has been boiled in water for the same purpose; but this boiling in water extracts all the gross worthless matter—such as starch, vegetable albumen, and coloring together with the extractive matter which latter is decomposed by the heat and precipitated, thus destroying the volatile and non-volatile active principles, and the dissolved starch unites with the tannic acid to form insoluble tannate of starch.

Having thus described my invention or discovery, what I claim as new, and desire to secure by Letters Patent, is—

As a vehicle to disguise the taste of quinine and other alkaloids, the elements of *Yerba santa* soluble in cold water.

In witness whereof I have hereunto set my hand.

WILLIAM H. McLAUGHLIN.

Witnesses:
S. H. NOURSE,
G. W. EMERSON.